United States Patent [19]
Thevenaz

[11] 3,797,923
[45] Mar. 19, 1974

[54] CINEMATOGRAPHIC PROJECTOR

[75] Inventor: Louis Thevenaz, Sainte-Croix, Switzerland

[73] Assignee: Bolex International SA, Sainte-Croix, Switzerland

[22] Filed: Oct. 10, 1972

[21] Appl. No.: 296,220

[52] U.S. Cl.................. 352/123, 352/125, 274/4 F
[51] Int. Cl. ............................................ G03b 21/04
[58] Field of Search.......... 352/8, 123, 125; 274/4 F

[56] References Cited
UNITED STATES PATENTS

| 2,755,030 | 7/1956 | D'Ornellas | 352/123 X |
| 3,704,940 | 12/1972 | Anderson | 274/4 F X |
| 3,658,193 | 4/1972 | Gross | 274/4 F X |
| 3,359,665 | 12/1967 | Gerry | 274/4 F X |

*Primary Examiner*—Monroe H. Hayes

[57] ABSTRACT

A movie projector for showing film cassettes that each have a take-up spool and a feed spool, the projector comprising a cassette projection station and a cassette rewind station, transfer apparatus for moving each of at least two cassettes one after the other into the projection station then into the rewind station, a first mechanism for engaging the take-up spool when in the projection station to wind film onto the cassette take-up spool and a second mechanism for engaging the feed spool when in the rewind station to rewind film onto the cassette feed spool, drive apparatus for concurrently driving the first and second mechanisms to concurrently wind and rewind the respective cassettes, and apparatus for controlling engagement of the first and second mechanisms with the respective take-up and feed spools for the winding and rewinding thereof and disengagement thereof to permit movement of the cassette from the projection station into the rewind station by the transfer apparatus.

11 Claims, 11 Drawing Figures

CINEMATOGRAPHIC PROJECTOR

FIELD OF THE INVENTION this invention relates to cinematographic projectors of the type capable of showing film cassettes.

BACKGROUND

There are known sound tape recorders designed for playing cassettes and having a storage compartment for unplayed cassettes above the playing position and an apparatus for transferring the used cassettes into a second compartment. However, these recorders do not have a means of rewinding the magnetic tape of the spent cassettes while a second cassette is being played, and therefore have the disadvantage of requiring time allocated to rewinding before replaying the beginning of the tape.

SUMMARY OF INVENTION it is a primary object of the invention to provide a new and improved cinematographic projector that avoids the aforementioned disadvantages.

The cinematographic projector according to the invention is designed to show film cassettes having a feed spool and a take-up spool, and comprises a driving mechanism for the film, a film channel and an optical projection system, and a storage compartment for the films to be projected, a driving mechanism for the feed spool of the first cassette to rewind the film onto this spool after projection and a driving mechanism on the take-up of the second cassette to wind the film onto this spool during projection.

The projector has at least one mobile plate which allows the removal of a cassette from the said driving mechanisms after rewinding or projection, and a means of transferring a cassette after playing, from its position near the driving mechansim for the feed spool (i.e., projection position) to a position near the driving mechanism for the take-up spool (i.e., rewinding position).

Other objects and features of the invention shall become apparent with the following detailed description when taken in view of the appended drawings in which.

DETAILED DESCRIPTION

Figure 1:
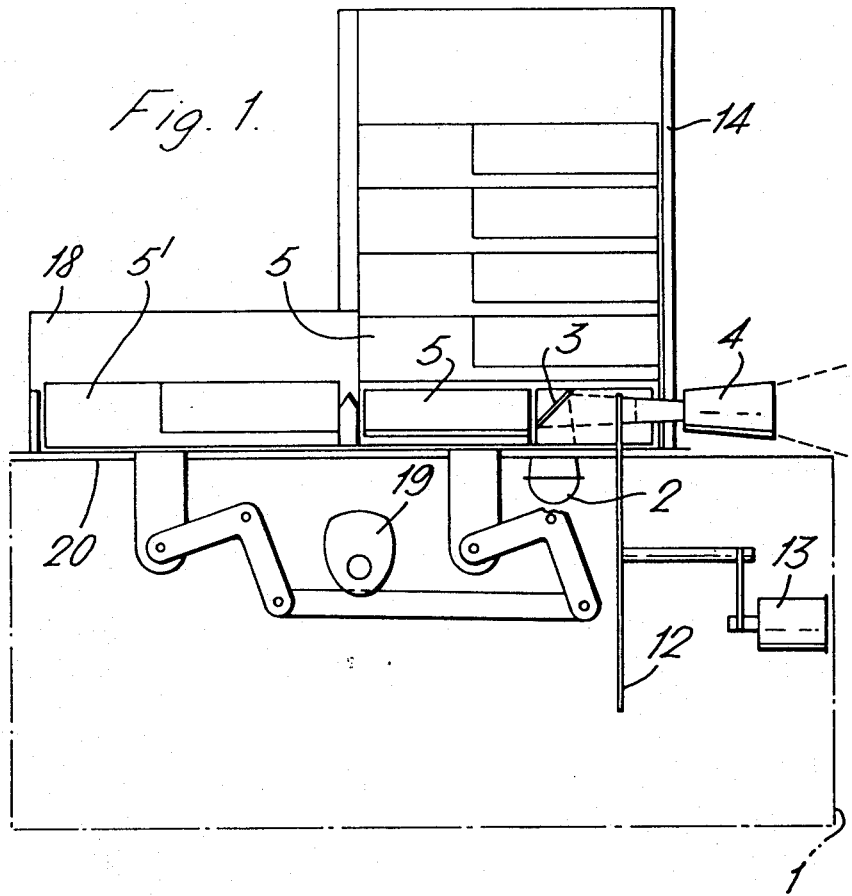
FIG. 1 is an elevation view of one example of a projector according to the invention with parts broken away. The projector is illustrated with cassettes in storage, one in the projecting position and one in the rewind position.
Figure 2:
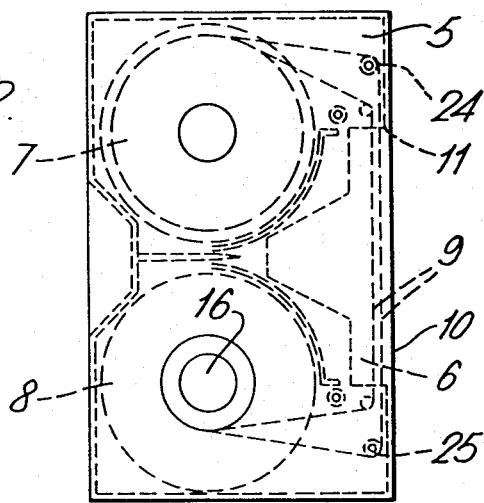
FIG. 2 is a top view of a cassette.

The cinematographic projector shown in FIG. 1 comprises a support housing or frame 1 bearing a reflector 2 which directs light rays, from a lamp upwards onto mirror 3 which reflects them at right angles into the axis of an objective 4. A cassette 5, containing a film 9 (FIG. 2) to be projected has a slot 6 in its under surface which allows the mirror 3 to penetrate inside the cassette 5 when it is in the projection position. The mirror 3 penetrates between the take-up spool 8 and the feed spool 7 in such a way that the light rays from the reflector 2 are directed onto the film 9 and through a gate 10 in the long side 11 of the cassette 5 and then along the axis of the objective 4.

Objective 4 has a prismatic erecting device for the image which is moved along horizontally between the take-up spool 8 and the feed spool 7 by a claw in a channel not shown in FIG. 1. A shutter 12 driven by a motor 13 is also situated in the path of the light rays between the mirror 3 and the film 9. The edge of this shutter 12 penetrates into the cassette 5 through the gate 10.

A magazine 14 for the cassettes 5 containing film cassettes to be projected is arranged above the driving mechanism of the film 9 and the optical projection system mentioned above. When the cassette 5 is in the projection position, a drive shaft 15 (FIGS. 5 and 6) penetrates into the hub 16 of its take-up spool 8. Shaft 15 which protrudes vertically into the bottom of the magazine 14 is able to rotate under the control of the shaft of the motor 13.

The feed spool 7 of a cassette 5 in the rewind position (the film of which has already been projected) is driven by a shaft 17 which protrudes into the bottom of a compartment adjacent to the said magazine 14 and penetrates the hub of feed spool 7. This shaft is also driven by the motor 13 in order to rewind the film in the spent cassette 5 onto its feed spool 7.

FIG. 1 represents the projector with a cassette 5 in the position for projecting the film, i.e. at the lowest level of the magazine 14 and another cassette 5' in the rewind position at the lowest level in the compartment 18. A cam 19 ensures that the channel, not shown, in the projection system is closed.

Figure 5:
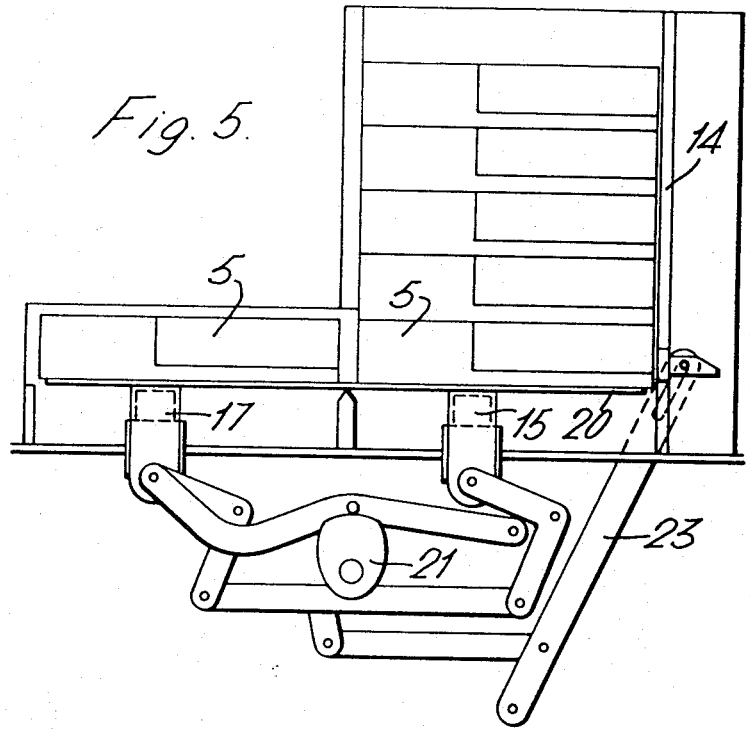
FIGS. 5 and 6 are an elevation of the apparatus for transferring the cassettes.

The two cassettes 5 and 5' rest on the bottom of the magazine 14 and the compartment 18 on a plate 20 which bears openings allowing the vertical drive shafts 15 and 17 to pass through. As shown in FIG. 5, when the two cassettes 5 resting on the plate 20 have been projected and rewound respectively, a cam 21 lifts the plate 20, which disengages the take-up spool and the feed spool of the first and second cassette respectively from their driving cams 15 and 17.

Figure 6:
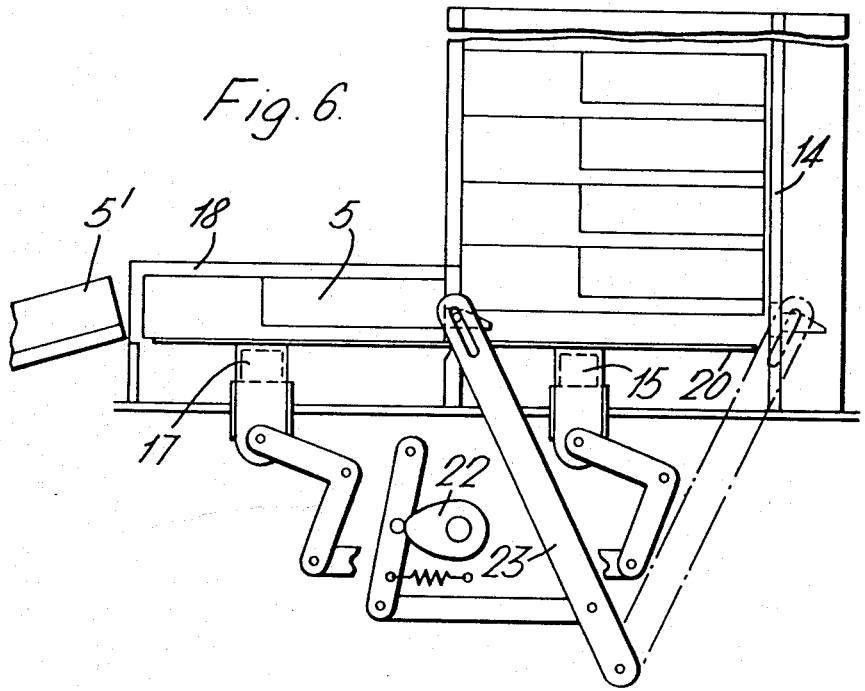

As shown in FIG. 6 a cam 22 actuates a push-lever 23 which transfers the cassette 5 in the magazine toward and into compartment 18. Simultaneously, the cassette 5' with the film rewound onto the feed spool is ejected from the compartment.

Figure 3:
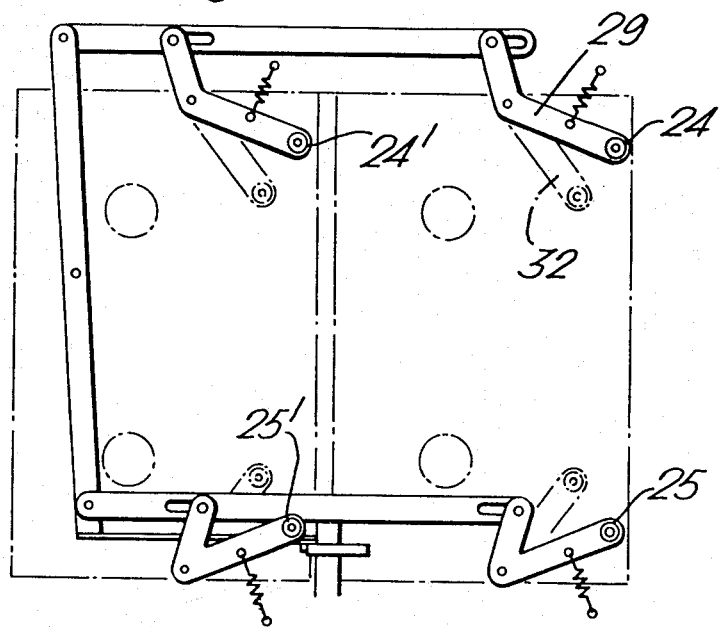
FIG. 3 represents a mechanism designed to put the film contained in the cassettes in position for simultaneous projection and rewinding.
Figure 4:
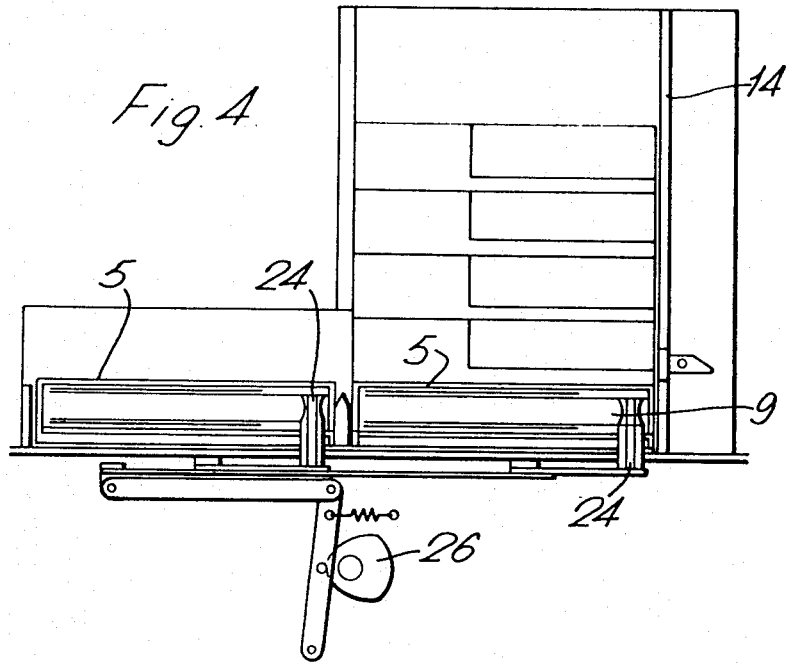
FIG. 4 is an elevation of the control device for the mechanism which places the film in position.

As shown in FIGS. 3 and 4, a fourth can 26 operates a linkage apparatus provided with two pairs of tension rollers 24, 25 and 24' and 25', respectively. The apparatus engages the film 9 and moves it into the correct position for projecting or rewinding after the cassettes have been brought to their correct position. See FIG. 2.

Figure 7:
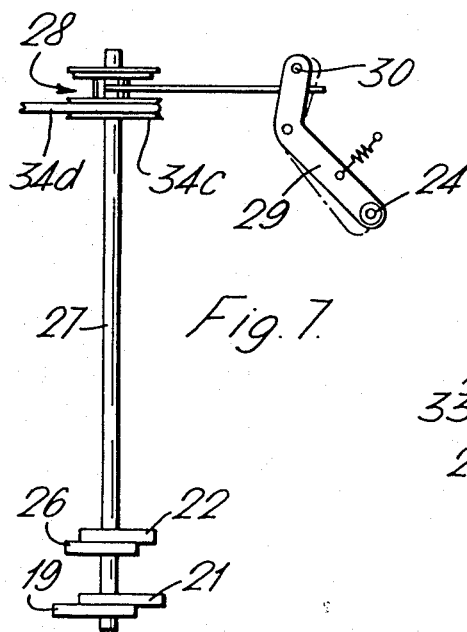
FIGS. 7 and 8 represent a driving mechanism for control cams on the mechanism described in FIGS. 1 and 4 to 6.
Figure 8:
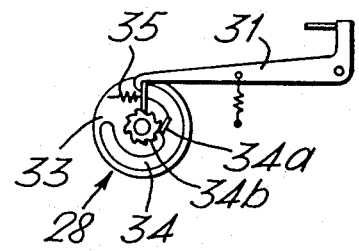

These cams 19, 21, 22 and 26 are all mounted on the same shaft 27 (FIGS. 7 and 8) and rotate under control of clutch 28 which is powered by a lever 29 bearing the tension roller 24 associated with film 9 to be projected. The extremity 30 of this lever 29 liberates another lever 31 which disengages the clutch mechanism when the said extremity is brought back to position 32 (see FIG. 3) after projection of the film 9 by the tension applied to the film by a driving claw not shown in the Figure. The shaft 27 is one piece with a disc 33 bearing a segment 34. This segment 34 is under the tension of a spring 35 and retained in position by the end of lever 31. On this segment there is a catch 34a which is engaged between the teeth of a ratchet-wheel when the segment 34 is liberated by the lever 31. The ratchet-wheel is rotated by a pully 34c and a belt 34d.

In the course of a 360° rotation, the cam 19 causes the film channel to be closed after the projection of the film, the cam 26 releases the tension it applies to the mechanism bearing the rollers 24 and 25, the cam 21 operates the mechanism which lifts the plate 20 and thus disengages the hubs of the feed spool of one cassette and the take-up spool of the other cassette from the driving shafts 15 and 17, respectively. Then the cam 22 operates the push-lever 23 which moves the cassette 5 containing the film which has just been projected from the projecting position in the magazine 14 to the rewinding position in the compartment 18 simultaneously ejecting the cassette which has just been rewound onto its feed spool 7.

Cam 21 then lowers plate 20, thus enabling the driving shaft 15 to fit into the hub of the take-up spool 8 of a new cassette in the magazine 14, and the driving shaft 17 to fit into the hub of the feed spool 7 of the spent cassette whose film has just been projected. The cam 26 causes the tension rollers 24 and 25 to move apart in the cassettes 5 which are in position for projection and rewinding respectively, and cam 19 closes the film channel.

The clutch 28 is then disengaged again and the projection of the film 9 in the new cassette 5 and the rewinding of the film which has just been projected onto the feed spool 7 of its cassette 5 can begin.

Figure 9:
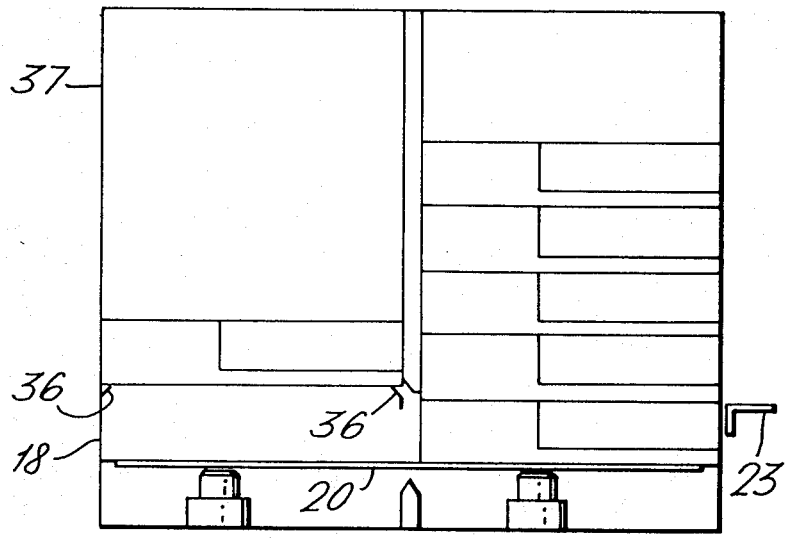
FIGS. 9 to 11 are similar to FIG. 5 showing variations of the embodiment of the apparatus shown in FIG. 5.

In another embodiment of the invention shown in FIG. 9, cam 21 lifts the plate 20 through a distance twice the height of a cassette before the cam 22 causes the transfer of the cassette 5 whose film has just been projected into the rewinding compartment 18. A second magazine 37 is located above compartment 18 and is provided with spring catches 36 near its lower edges to retain the lowest cassette introduced into the magazine 37. Thus there is a space under this lowest cassette into which a used cassette, may be transferred for rewinding.

Figure 10:
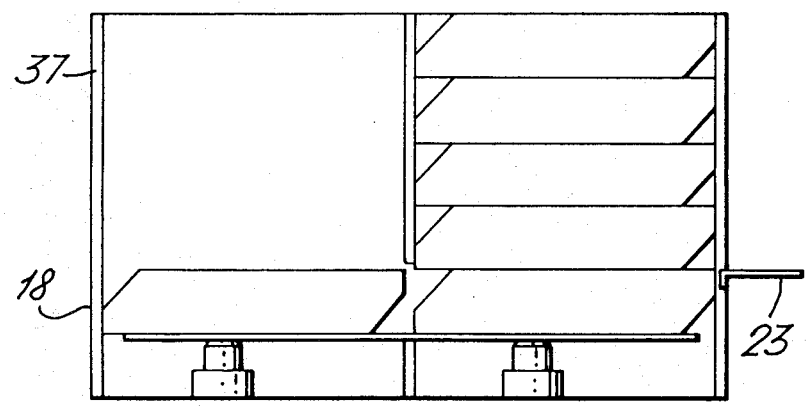

In a further embodiment shown in FIG. 10, the long sides of the cassette 5 are at least partially inclined away from a vertical position, so that when a cassette whose film has just been projected is pushed by the push-lever 23 into the rewinding compartment 18, the spent cassette pushes the first cassette whose film has just been rewound up into the magazine 37. Initial lift is obtained by the engaging inclined surfaces of the respective ends of the cassettes after which the spent cassette slides under the one below magazine 37.

Figure 11:
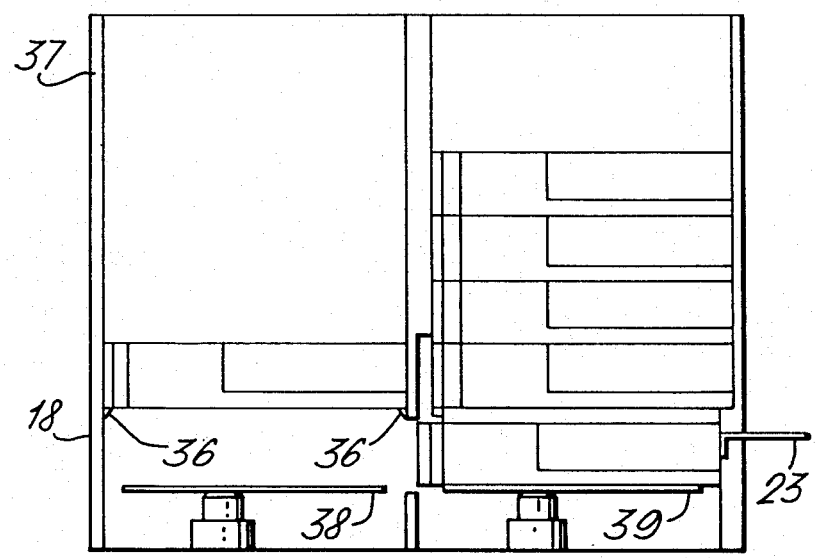

According to another embodiment shown in FIG. 11, the projector has two plates 38 and 39 actioned successively by two cams. First plate 38 lifts the cassette 5 whose film has been rewound into the magazine 37 where it is retained by elastic supports 36. Then after it has returned to its original lower level it receives the cassette 5 whose film has just been projected, and which is transferred from the projection compartment by the push-lever 23.

Numerous other embodiments and modifications can be made without departing from the spirit and scope of the invention. For example, the plate 20, instead of being flat, can be made in two levels, the higher level corresponding with that of the cassette whose film is to be rewound and being connected by a sloping surface to the lower level which corresponds with that of the cassette whose film is to be projected. After projecting the film, this cassette is pushed up the slope to the higher level of the plate 20 in the rewinding compartment which causes the cassette whose film has been rewound to be pushed into the magazine 37.

What is claimed is:

1. A movie projector for showing film cassettes that each have a take-up spool and a feed spool, said projector comprising (a) a cassette projection station and a cassette rewind station, (b) transfer means for moving each of at least two cassettes one after the other into the projection station than into the rewind station, (c) a first mechanism for operatively engaging the take-up spool when in the projection station to wind film onto the cassette take-up spool and (d) a second mechanism for operatively engaging the feed spool when in the rewind station to rewind film onto the cassette feed spool, (e) drive means for concurrently driving said first and second mechanisms to concurrently wind and rewind the respective cassettes, and (f) control means for controlling engagement of said first and second mechanisms with the respective take-up and feed spools for concurrent winding and rewinding thereof and for controlling the disengagement thereof to permit movement of the cassette from the projection station into the rewind station by the transfer means, said transfer means comprising plate means for supporting the cassettes when in the projection and rewind stations and wherein said first and second mechanisms comprise upstanding first and second drive shafts adapted to engage the hubs of take-up and feed spools, respectively, and said control means comprises means for relatively moving said shafts and plate means so that the shafts penetrate the plate means to engage the respective take-up and feed spoolds.

2. A projector according to claim 1 wherein said plate means comprises two independent plates, two separate mechanisms each actuated by a cam coupled to the mechanical power source for the projector, each said separate mechanism coupled to one of said plates to lift separately the plate associated with the first cassette after is is rewound and to lift separately the plate associated with the second cassette after the film it contains is projected.

3. A projector as set forth in claim 1 comprising magazine means for storing a plurality of cassettes and for feeding them one at a time to the projection station, when the foremost cassette is moved into the rewind station.

4. A projector as set forth in claim 1 wherein the plate means comprises a single plate extending into the projection and rewind stations.

5. A projector according to claim 1 wherein the plate means comprises a first plate at the projection station and a second plate at the rewind station and said means for relatively moving comprises two independent mechanisms each driven by a cam mechanism and each coupled to one of the first and second plates for operatively moving each respective said first and second plates.

6. A projector according to claim 1 in which said transfer means comprises a push-lever means for moving the cassette in the projection position after it has been lifted free of the respective shaft by said plate means.

7. A projector according to claim 1 further comprising (a) spaced rollers to engage the film when the cassette is in the projection and rewind positions, respectively, to guide the movement of the film in predetermined paths during projection and rewinding and (b) a linkage means for moving the rollers into and out of engagement with the respective film.

8. A projector according to claim 3 in which the magazine is located above the projection station and said plate means being in vertical alignment with and forming a movable floor for said magazine means.

9. A projector according to claim 1 in which the transfer means comprises a push lever movable to engage the cassette in the projection station after the cassette has been moved by said plate means to disengage its associated drive shaft.

10. A projector according to claim 9 further comprising two roller assemblies operatively coupled to take up the film slack contained in the cassettes when said cassettes are in the projecting and rewinding positions respectively, said assemblies being operable by the action of a cam coupled to the mechanical drive of the projector.

11. A projector according to claim 10 further comprising a clutch assembly operative and selectively coupling the cam to the mechanical drive of the projector.

* * * * *